United States Patent
Matsumoto et al.

(10) Patent No.: US 7,529,044 B2
(45) Date of Patent: May 5, 2009

(54) OPTICAL ELEMENT, OPTICAL SYSTEM AND METHODS OF MANUFACTURING THE SAME AS WELL AS OPTICAL EQUIPMENT

(75) Inventors: Mitsuaki Matsumoto, Hirakata (JP); Keiichi Kuramoto, Kadoma (JP); Nobuhiko Hayashi, Osaka (JP); Hitoshi Hirano, Nishinomiya (JP)

(73) Assignee: Sanyo Electric Co., Ltd., Moriguchi, Osaka (JP)

( * ) Notice: Subject to any disclaimer, the term of this patent is extended or adjusted under 35 U.S.C. 154(b) by 121 days.

(21) Appl. No.: 11/361,353

(22) Filed: Feb. 24, 2006

(65) Prior Publication Data
US 2006/0216112 A1    Sep. 28, 2006

(30) Foreign Application Priority Data
Feb. 25, 2005 (JP) .............................. 2005-051590
Jan. 31, 2006 (JP) .............................. 2006-023285

(51) Int. Cl.
*G02B 7/02* (2006.01)
(52) U.S. Cl. ...................................... 359/811
(58) Field of Classification Search ................. 359/811
See application file for complete search history.

(56) References Cited

U.S. PATENT DOCUMENTS 6,177,214 B1 *  1/2001  Yokoyama et al. ............. 430/7
6,965,476 B2 * 11/2005  Sato ........................... 359/569

FOREIGN PATENT DOCUMENTS

JP    2002-072078    3/2002
JP    2003-172807    6/2003

* cited by examiner

*Primary Examiner*—William C Choi
(74) *Attorney, Agent, or Firm*—NDQ&M Watchstone LLP; Vincent M. DeLuca

(57) ABSTRACT

An optical element has a marker provided in the form of an optical fault at a predetermined location in the effective optical area thereof for positioning. The optical fault is a marker 1a provided at a specific location on the effective optical area of the optical element 1 preferably in the form of a projection, a recess, a tinted portion, a different refraction portion, an air bubble, or a particle on or in the optical element 1. More preferably, the marker 1a is located at or around the center of the optical element 1 and its area size is not greater than 0.4% of the effective optical area of the lens 1.

20 Claims, 18 Drawing Sheets

(a)

(b)

(c)

(d)

(a)

(b)

(c)

(d)

(e)

(a)

(b)

(c)

(a)

(b)

(a)

(b)

(c)

(d)

OPTICAL ELEMENT, OPTICAL SYSTEM AND METHODS OF MANUFACTURING THE SAME AS WELL AS OPTICAL EQUIPMENT

The priority Japanese Patent Application Numbers 2005-51590 and 2006-23285 upon which this patent application is based is hereby incorporated by reference.

BACKGROUND OF THE INVENTION

1. Field of the Invention

The present invention relates to optical elements such as a lens, a mirror, a prism, a filter and a diffractive optical element, for use in optical equipment such as camera machines including a digital camera, a camera-equipped mobile telephone and the like, projection machines including a video camera, a liquid crystal projector, a liquid crystal rear projector and the like, a telescope, and a microscope, optical information equipment such as an optical pickup, and optical communication equipment such as an optical transceiver module and an optical switch, and also relates to a method of manufacturing the same.

2. Description of the Related Art

In general, an optical system in optical equipment such as a camera machine is configured by a combination of optical elements including a large number of lenses, mirrors, prisms, filters and diffractive optical elements. Further, the optical system is combined with components including a light-emitting device such as an LED, an image display device such as an LCD, a photodetector such as a photodiode or a CCD; thus, an optical equipment is configured. It is essential for assembling the optical system or the optical equipment to correctly align those components with an optical axis. If the optical system or the optical equipment is dislocated from the optical axis, there arises a problem of skew and blurring of an image, so that good image forming performance cannot be obtained.

Conventionally, the optical system has been fabricated by assembling the finely sized optical components including lenses in a frame. As disclosed in JP-A 2003-172807, a technique is known where a lens barrel includes two groups of lenses secured in a frame. It is common in the prior art that the lenses are mounted to a frame for aligning with the optical axis at a practically acceptable degree of precision.

As digital cameras have been marketed widely, some types of them are built in mobile telephones. It is thus desired for reducing of the overall dimensions that the lenses in the optical system are as small as 3 mm in diameter. In addition, a variety of CCDs as the photodetectors have been developed with reduction of the size and improvement of the precision. As the result, the alignment with the optical axis during the manufacturing process will be more troublesome. In fact, the degree of precision for alignment with the optical axis is measured in about micrometers. More specifically, the tolerance of lens diameter is as small as substantially about tens micrometers. It is hence impractical that the degree of accuracy for alignment with the axis depends on the conventional manner of mounting the optical components to a housing.

For compensation, another technique is disclosed in JP-A 2002-72078 where a marker is provided around the lens by dry etching for use as a reference in the action of alignment with the optical axis. However, the area for such a marker will hardly be spared when the lens is significantly reduced in the overall size.

SUMMARY OF THE INVENTION

It is hence an object of the present invention to provide an optical element arranged for being positioned at higher accuracy with much ease and a method of manufacturing the optical element.

An optical element according to the present invention comprises a marker provided in the form of an optical fault at a specific position on the effective optical area of the optical element for positioning of the optical element.

The optical element according to the present invention may be modified in which the optical fault provided as the marker for positioning is a projection, a recess, a tinted portion, or a different refraction portion of the optical element or an air bubble or a particle in the optical element.

As a preferred embodiment of the present invention, an optical element comprises an optical fault provided as the marker for positioning preferably in the form of a projection, a recess, a tinted portion, or a different refraction portion, an air bubble, or a particle provided at the specific position on the effective optical area of or in the optical element.

In the optical element according to the present invention, the marker is located on the effective optical area. Since no extra space outside the effective optical area is required unlike the prior art, the optical element can favorably be reduced in the overall size without sacrificing the space for the marker.

Herein, the effective optical area refers to a region where light can pass in design. Accordingly, the marker in the present invention is located in a region where light passes in design.

Preferably, the effective size of the marker is not greater than 200 µm. When its effective size is not greater than 200 µm, the marker can be monitored within the viewing field of a common optical microscope. More particularly, the minimum of the effective size of the marker is equal to a level that can be monitored within the viewing field of a common optical microscope or not smaller than 10 µm or preferably not smaller than 50 µm. If the marker is smaller than 10 µm in the effective size, its identification with a common optical microscope will be difficult. When smaller than 50 µm, the marker will be monitored with difficulty.

The effect size of the marker means an extension that can effectively be utilized for correctly positioning the component by the marker and may be a maximum of the diameter. More particularly, when the marker is arranged of a circular shape, its diameter represents the effective size. When the marker is of an ellipse or oval shape, its longer diameter represents the effective size. When the marker is of a rectangular shape such as a square, its diagonal line represents the effective size.

As will be described later, the effective size may be equal to an area surrounded by the marker(s) provided around the center of the optical element.

According to the present invention, the marker may be provided in the form of preferably a projection, a recess, a tinted portion, or a different refraction portion of the optical element or an air bubble or a particle in the optical element. For example, the projection may be fabricated with a die which has a recessed region provided at the corresponding region thereof for use in the action of shaping the optical element. The recess may similarly be fabricated with a die which has a raised region thereof. The recess may also be fabricated by machining, wet etching, or dry etching of the surface of the optical element.

The tinted portion may be fabricated when the surface of the optical element is tinted with a die, a pigment containing ink, or a paint by, e.g., an ink jet technique.

The different refraction portion, the air bubble, or the particle in the optical element may be fabricated by a different refraction material, an air bubble, or a particle impregnated in the optical element during the manufacturing process.

According to the present invention, the marker is preferably provided at the center or around the center of the optical element. When the marker is around the center of the optical element, it is embodied by a set of markers arranged in symmetrical relationship. It is noted that the center represents all center regions along the optical axis and may be in or on the optical element. The term "optical axis" represents a chain of the major axes of the optical elements provided in the optical system.

The optical element according to the present invention may be modified in which it is made entirely or partially of an organic polymer material. Preferably, the marker is positioned at the organic polymer material region of the optical element.

The organic polymer material may be selected from energy setting resins such as thermoplastic resin or ultraviolet curing resin, thermosetting resins, and organic/inorganic composite materials. More specifically, examples of the organic polymer material include organic metal polymer prepared by hydrolyzing and polymerizing metal alkoxide, acrylate resin, epoxy resin, urethane resin, urethane acrylate resin, polyester acrylate resin, epoxy acrylate resin, their combination, and their mixture with a dispersed form of particles of metal oxide such as $SiO_2$, $TiO_2$, $ZrO_2$, or $Nb_2O_5$.

The optical element according to the present invention may be modified in which the organic polymer material is provided in the form of a layer on a substrate of a glass material. For example, the optical element is a composite aspherical lens having an organic polymer layer provided as an aspherical lens on a spherical glass lens. The substrate may be made of, rather than glass, any optical resin such as ARTON resin produced by JSR, ZEONEX resin produced by Nippon Zeon, or OKP4 produced by Osaka Gas Chemicals (each in trade name).

The optical elements according to the present invention may include a lens, a mirror, a prism, a filter, and a diffractive optical element.

As a first aspect of the present invention, a method of manufacturing the optical element which is made entirely or partially of an organic polymer material and has a marker provided therein or thereon is characterized in that while the organic polymer material is shaped with a die(s) which has a marker forming region, the marker is shaped with the marker forming region.

The marker forming region of the die may be a raised region or a recessed region.

Alternatively, the die may have a filling inlet provided therein for introducing the organic polymer material or its pre-cured, liquid form as so arranged that when the organic polymer material or its pre-cured, liquid form is introduced, a burr which then turns to the marker can be produced at its location, thus allowing the filling inlet to serve as a marker forming region of the die. Accordingly, the filling inlet in the die can serve as the marker forming region.

When the optical element is manufactured by providing an organic polymer layer on the surface of a substrate, the action of positioning the die in relation to the substrate may be conducted according to a second aspect or a third aspect of the present invention.

As the second aspect of the present invention, a method of manufacturing the optical element is characterized by the steps of measuring the diameter of both the substrate and the die, calculating from a difference in the measurement, when each of the substrate and the die has been pressed against the reference surface, a dislocation along the horizontal from the reference surface and moving the substrate or the die away from the reference surface by a distance equal to the dislocation thus to position correctly along the horizontal, and while the substrate and the die remain correctly positioned along the horizontal, moving the substrate or the die in the vertical until the substrate and the die come into direct contact with each other and shaping the organic polymer material with the die.

Using the method of the second aspect, the positional alignment between the substrate and the die can be conducted with much ease.

As the third aspect of the present invention, a method of manufacturing the optical element is characterized by the steps of, when the substrate is a spherical lens, placing the die provided with the filling inlet on the spherical lens, which remains seated along the horizontal with its spherical side facing upwardly, so that the filling inlet faces downwardly to extend along the vertical, illuminating the spherical lens with an autocollimator light across the filling inlet of the die and correctly positioning the spherical lens and the die along the horizontal when the autocollimator light is reflected by the spherical side and passed through the filling inlet, and while the spherical lens and the die remain correctly positioned along the horizontal, moving the substrate or the die along the vertical to press the die against the substrate for shaping the organic polymer material.

Using the method of the third aspect, the positional alignment between the spherical lens and the die can be conducted easily and accurately.

An optical system according to the present invention comprises at least one of the foregoing optical elements. The optical system according to the present invention comprises a construction including at least one optical element which has an optical function of diverging or focusing a ray of light to develop an optical image. Accordingly, the optical system is constructed by at least a lens, a mirror, a prism, a filter, a diffractive optical element, or any other optical element for diverging or focusing a ray of light to develop an optical image.

As the optical system includes the optical element provided with a marker for positioning, its assembly can readily be conducted through accurate positioning.

A method of manufacturing an optical equipment according to the present invention is provided in which the optical equipment is manufactured from a combination of one of the foregoing optical elements and a component having a marker or a pattern provided as the marker. The method comprises the steps of placing any of the optical element and the component so that the marker or the pattern is aligned with a specific location in the viewing field of a microscope, and while the microscope remains fixed at its position along the horizontal, placing the other, the component or the optical element, so that the marker or the pattern is aligned with a specific location in the viewing field of a microscope thus to correctly position the optical element and the component along the horizontal.

Using the method, the optical element and the component can be positioned and assembled together easily and accurately thus to construct an optical system.

An optical equipment according to the present invention comprises the optical system described above. Examples of the optical equipment according to the present invention are optical equipment including a camera machine such as a digital camera or a camera-equipped mobile telephone, a projection machine such as a video camera, a liquid crystal projector or a liquid crystal rear projector, a telescope, a microscope, any other device, optical information equipment such as an optical pickup, and optical communications equipment such as an optical transceiver module or an optical switch.

The optical equipment according to the present invention may include any component which has a pattern of pixels or electrodes used as the marker. More particularly, the optical equipment according to the present invention may comprise a combination of the optical element of the present invention and a component on which the optical element is positioned and secured. The component is arranged to carry a marker or a pattern used as the marker for correctly positioning the optical element in relation to the component.

The optical equipment according to the present invention may also include the inventive optical system for developing a focused image.

Preferably, the area of the marker on the optical element in the optical equipment according to the present invention is arranged, when the dynamic range of an image signal to be processed excluding the optical system is D, to be not greater than 1/D the effective optical area. This permits any artifact in a resultant optical image to be lower than the level of noise in the equipment. Accordingly, the marker on the optical element can be fabricated without disturbing the S/N ratio of the image signal.

For example, when the dynamic range of a digital camera lens for producing 8-bit gradation of each of the R, G, and B colors is $2^8=256$ ($\cong 48$ dB), the area of the marker is set to not greater than $1/256 \cong 0.4\%$ of the effective optical area size of the digital camera lens. Accordingly, assuming that the lens(es) is substantially 3 mm in the diameter, the diameter of the marker can favorably be not greater than 200 μm.

The optical element according to the present invention is arranged in which the marker is provided at a specific location of the effective optical area of the optical element in the form of a projection, a recess, a tinted region, or a different refraction region of the optical element or an air bubble or a particle impregnated in the optical element. Since the marker is located within the effective optical area, it can be provided on the optical element of a smaller size.

Also, as the marker is used as a reference for alignment with the optical axis, the action of positioning can be conducted at higher accuracy.

The method of manufacturing the optical element according to the first aspect of the present invention allows the marker to be shaped with the marker forming region of the die during the action of shaping the organic polymer material, hence improving the ease of fabricating the marker.

The method of manufacturing the optical element according to the second aspect of the present invention allows the organic polymer layer to be provided on the substrate with the die having been positioned correctly in relation to the substrate.

The method of manufacturing the optical element according to the third aspect of the present invention allows the die to be positioned at higher accuracy over the spherical lens, thus improving the accuracy of shaping the organic polymer layer on the spherical lens.

The optical system and the optical equipment with the optical system according to the present invention allows the marker on the optical element to be utilized for alignment of the optical element, thus facilitating the action of assembling and positioning.

The method of manufacturing the optical system according to the present invention allows the optical element and the component to be positioned and assembled at higher accuracy but no difficulty, thus improving the positional relationship in the optical system.

DESCRIPTION OF THE PREFERRED EMBODIMENTS

Some embodiments of the present invention will now be described in more detail as only illustrative but not restrictive.

Embodiment 1

Figure 1:
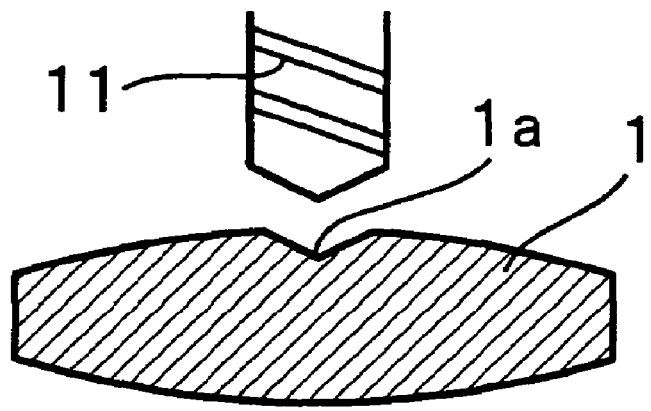
FIG. 1 is a cross sectional view of an optical element showing one embodiment of the present invention.

FIG. 1 is a side view of a lens as an optical element showing one embodiment of the present invention. As shown in FIG. 1, the lens 1 has a recess or marker 1a provided in the center thereof. The marker 1a shown in FIG. 1 is arranged of a circular recessed shape and can thus be implemented with the use of a cutting tool 11 such as a drill. The lens 1 is made of a glass material such as BK7 type, having a diameter of 3 mm. Its marker 1a is 200 μm in the diameter and substantially 50 μm in the depth.

The lens 1 of the embodiment is intended for use in an 8-bit gradation digital camera and the size of its marker 1a is 0.4% of the effective optical area of the lens 1. As the marker 1a is of the circular shape, its effective area is 200 μm in the diameter. It is however desirable to decrease the effective area of the marker 1a when the lens is smaller than that of this embodiment or used in another equipment which is higher at the number of gradation bits or in a further equipment such as an analog equipment at a higher S/N ratio which is greater in the dynamic range.

Embodiment 2

Figure 2:
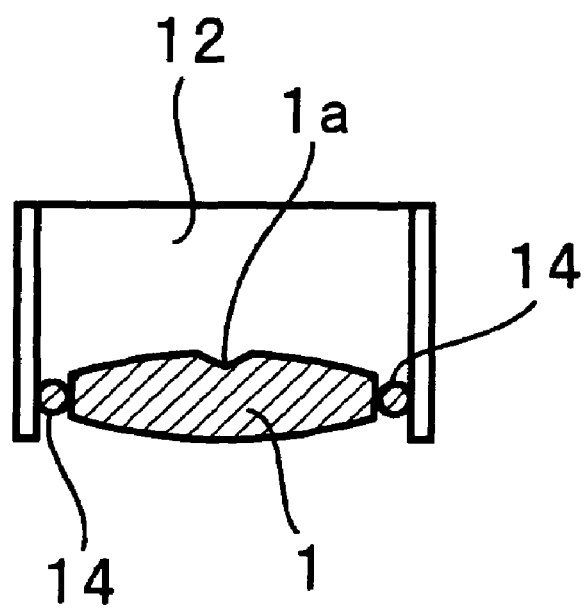
FIG. 2 is a cross sectional view showing the optical element of the embodiment, shown in FIG. 1, mounted to a frame.
Figure 3:
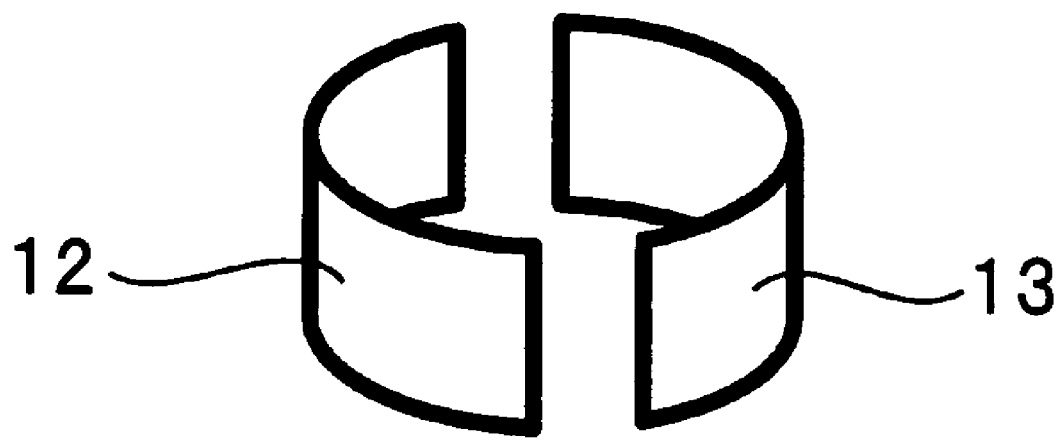
FIG. 3 is a perspective view of a semi-circular frame in which a lens is installed.
Figure 4:
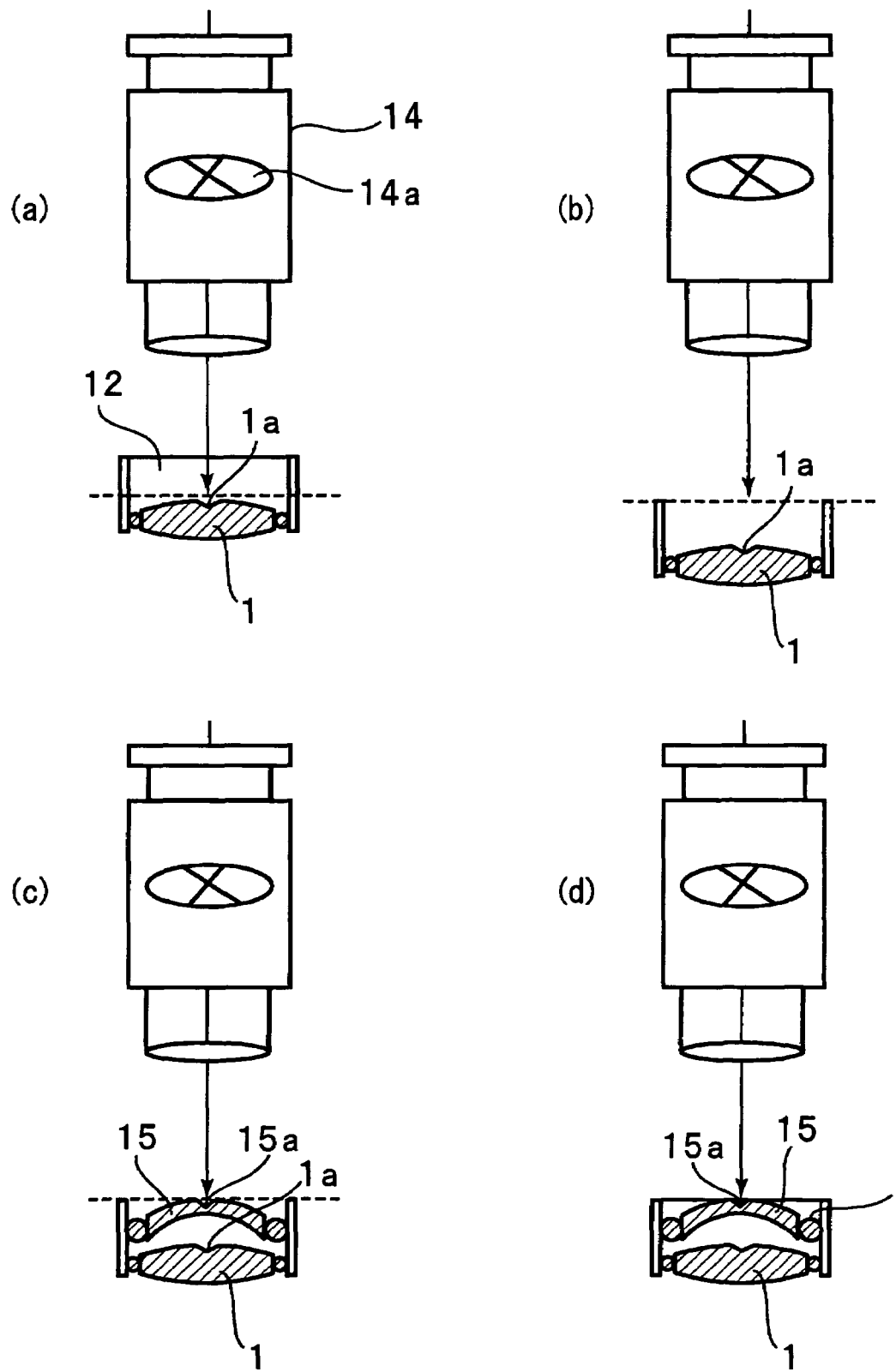
FIGS. 4A to 4D are cross sectional views showing steps of positioning and securing the optical element of the embodiment shown in FIG. 1.

FIGS. 2 to 4 illustrate steps of manufacturing an optical system from a combination of the lens shown in FIG. 1 and other components. The action starts with securely holding the lens 1 between a pair of semi-circular frames 12 and 13 as shown in the perspective view of FIG. 3.

More particularly, as shown in FIG. 2, the lens 1 is bonded by an adhesive 14 to the inner side of the semi-circular frame 12.

Next, as shown in FIG. 4A, the lens 1 held in the semi-circular frame 12 is positioned beneath at the focusing point of a microscope 14. The lens 1 is then moved horizontally until its marker 1a is viewed at the scale 14a in the viewing field of the microscope 14.

This is followed by lowering the semi-circular frame 12 and the lens 1 by a distance defined by the lens design, as shown in FIG. 4B, and placing another component or lens 15 at the focusing point of the microscope 14 with the use of, e.g., a vacuum collet and adjusting the position of the lens 15 the same until its marker 15a is viewed at the scale 14a of the microscope 14, as shown in FIG. 4C.

Then, the lens 15 is bonded by an adhesive 14 to the semi-circular frame 12, as shown in FIG. 4D.

The other semi-circular frame 13 is joined to the semi-circular frame 12 to sandwich and secure the two lenses 1 and 15 by adhesive.

A resultant optical system in this embodiment is thus composed of the lens 1 with the marker 1a and the other lens 15 with the marker 15a which have been positioned and assembled together at higher accuracy.

The lens 15 in this embodiment is a meniscus lens made of a glass material of SF10 type for constructing a common achromatic mode of the optical system. Alternatively, the optical system may be of another multi-lens complex mode rather than the achromatic mode. Also, the optical system may include any other optical components than the lenses including a wavelength plate, a filter, and a diffractive optical element.

Embodiment 3

Figure 5:
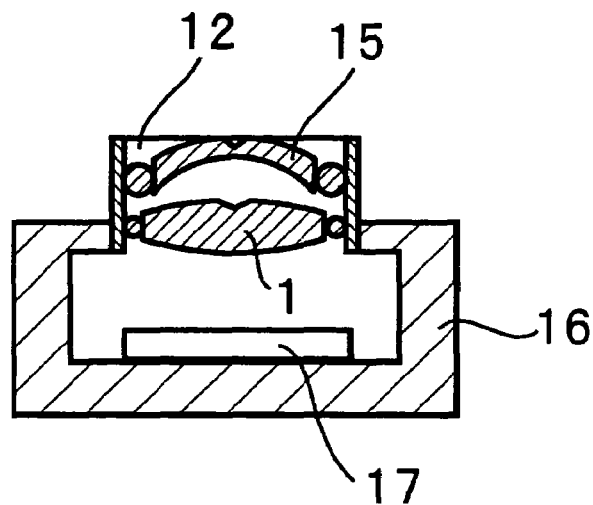
FIG. 5 is a cross sectional view of a camera module which includes the optical element of the embodiment shown in FIG. 1 accompanied with an imaging device (CCD)

FIG. 5 is a cross sectional view showing a camera module provided as an optical equipment which has an imaging device (CCD) 17 mounted in a housing 16 and aligned with the optical system of the previous embodiment which comprises the lens 1 and the lens 15 secured between the two frames 12 and 13.

In the camera module shown in FIG. 5, the positioning of the optical system in relation to the imaging device is conducted by the same manner as of Embodiment 2. It is hence desired to have a marker on the imaging device. Since the imaging device such as a CCD includes a pattern of pixels, its marker may be implemented by the pattern of pixels. Accordingly, the imaging device in this embodiment is provided with no marker and its positional alignment with the optical system is based on the pattern of pixels.

Figure 24:
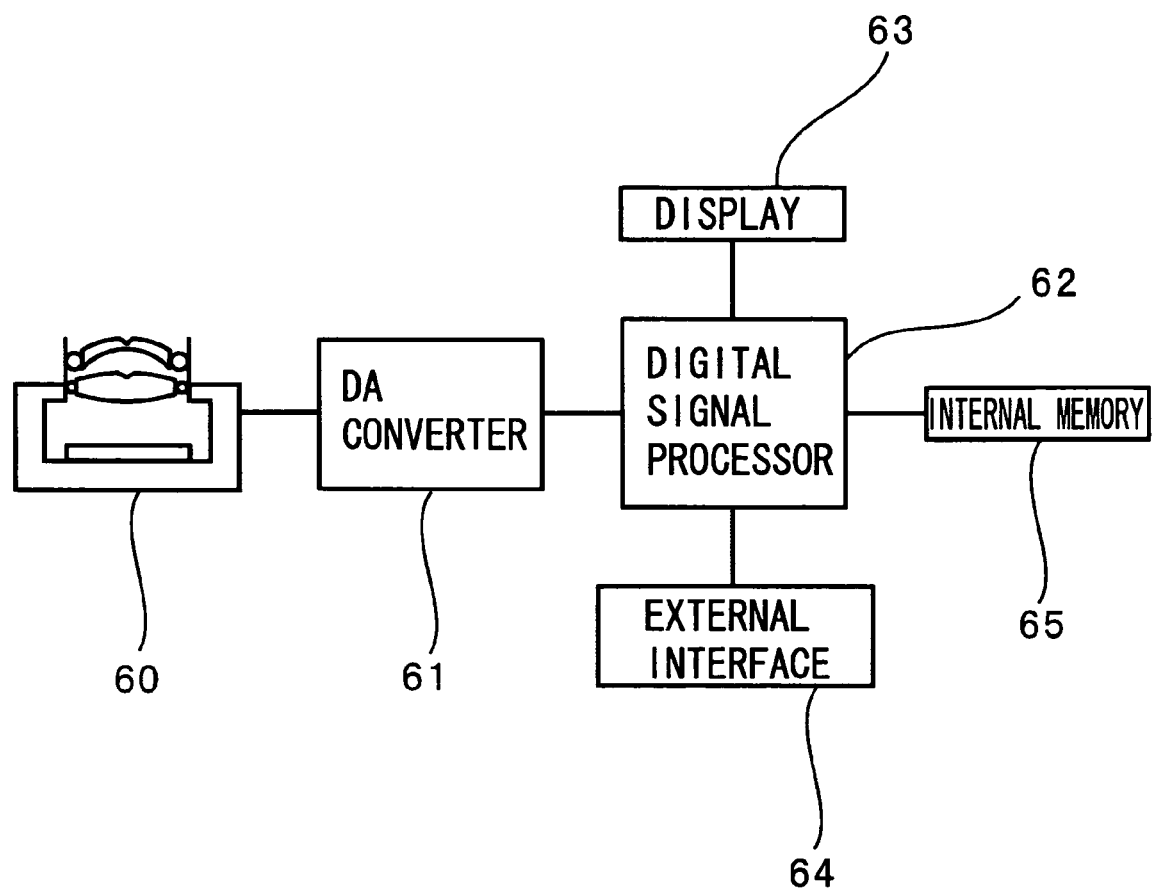
FIG. 24 is a block diagram of a digital camera with the camera module shown in FIG. 5, showing a still further embodiment of the present invention.

FIG. 24 is a block diagram showing a digital camera in which the camera module of this embodiment shown in FIG. 5 is employed. As illustrated in FIG. 24, the cameral module 60 shown in FIG. 5 is connected to a DA converter 61 which is in turn connected with a digital signal processor 62. The digital signal processor 62 is connected with a display 63, an external interface 64, and an internal memory 65. With the DA converter 61 of 8-bit type providing a dynamic range of 256, any image interruption produced by the lens with 200 μm of the marker side of Embodiment 1 can be as small as not exceeding the resolution of the DA converter 61, thus hardly affecting the S/N ratio of each image.

It was found through a series of experimental image capturing actions that the quality of pictures produced by the digital camera of this embodiment was favorable with no presence of significant noises and skew.

Although the markers or optical faults are provided on the two lenses respectively in this embodiment, they are aligned with each other along the optical axis and their adverse effect will never be doubled.

Also, the imaging device in this embodiment is a CCD, it may be implemented by any applicable form such as a C-MOS image sensor. Moreover, the camera module of this embodiment may be applied to a digital cameral, a digital video camera, a camera-equipped mobile telephone, or an automobile mounting camera.

Embodiment 4

Figure 6:
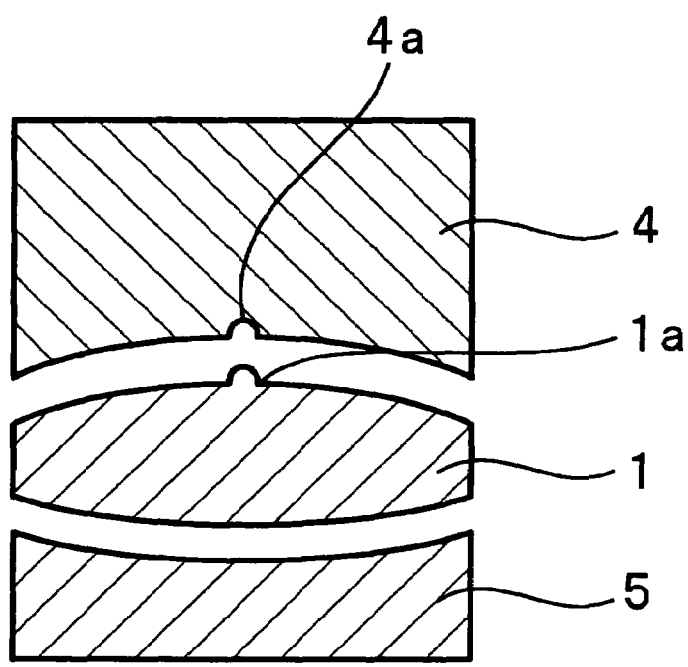
FIG. 6 is a cross sectional view of an optical element showing another embodiment of the present invention.

FIG. 6 is a cross sectional view showing a method of molding a resin material in a set of dies to fabricate a lens as the optical element according to a further embodiment of the present invention. As shown in FIG. 6, the lens 1 is fabricated by molding the resin material in a set of dies 4 and 5. With the die 4 having a recess 4a provided in the inner side at the center thereof, a marker 1a of a raised form can be shaped at the center of the lens 1 during the molding process.

The lens 1 is made of a commercial resin material, ARTON (trade name), produced by JSR. The diameter of the lens 1 is 3 mm while the marker 1a is 200 μm in the diameter and substantially 50 μm in the height.

The material of the lens 1 is not limited to ARTON but may be selected from other commercially available resin materials including ZEONEX (trade name) of Nippon Zeon and OKP4 (trade name) of Osaka Gas Chemicals.

Figure 7:
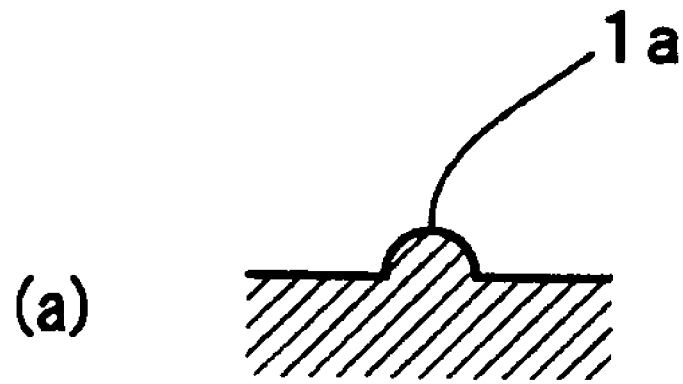
FIGS. 7A to 7D are cross sectional views showing different forms of a marker according to the present invention.
Figure 7:
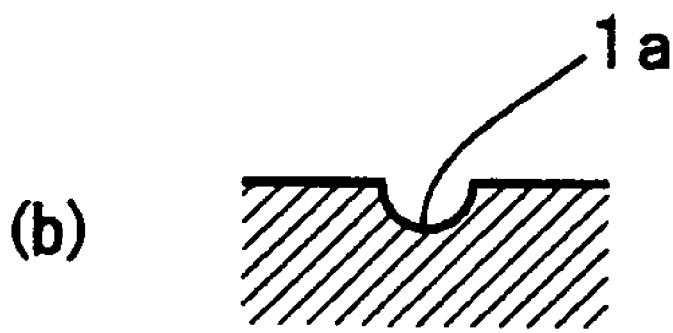
Figure 7:
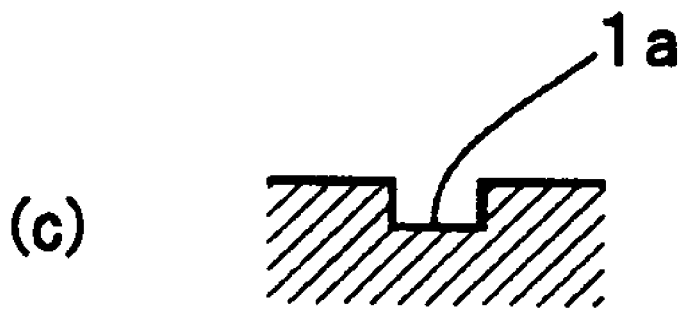
Figure 7:
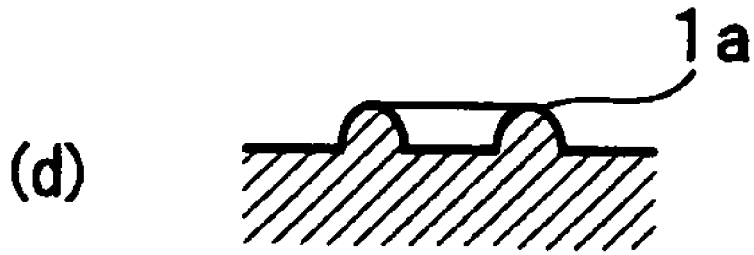

The marker 1a in this embodiment may also be arranged of such another raised shape as shown in FIG. 7A or such recessed shapes as shown in FIGS. 7B and 7C. Alternatively, the marker 1a may be arranged of an annular projection shown in FIG. 7D or an annular recess. The shape of the marker 1a is not limited to the particular projections or recesses. The marker 1a may further be formed from a tinted portion of the lens.

Figure 8:
FIGS. 8A to 8E are plan views showing more different forms of the marker according to the present invention.
Figure 8:
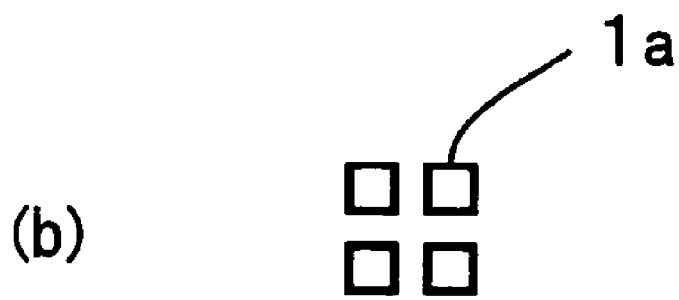
Figure 8:
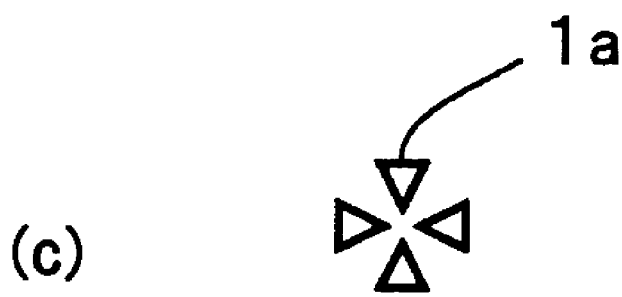
Figure 8:
Figure 8:
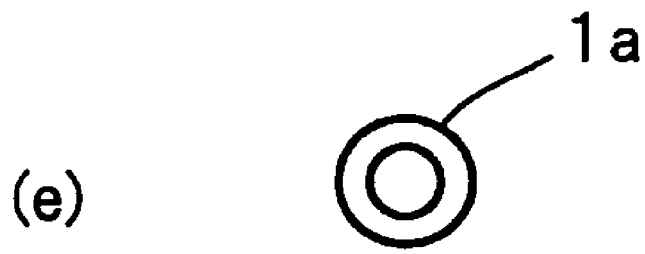

The number of the markers is not limited to one but may be two or more such as shown in FIGS. 8A to 8E. FIG. 8A illustrates a rectangular shape at plan view of the marker 1a. FIG. 8B illustrates four of the rectangular markers 1a. When two or more of the markers are provided, they may preferably be allocated about the center of the optical element or more preferably in symmetrical relationship about the center. As shown in FIG. 8C, the marker may be a set of triangle shapes of which the vertices face the center of the optical element, thus facilitating the recognition of the center. FIG. 8D illustrates a circular shape of the marker similar to that of Embodiment 1. FIG. 8E illustrates an annular projection or recess of the marker similar to that shown in FIG. 7D. The marker may specifically be arranged to carry other data, e.g., the manufacturing number, the manufacturing date, and the specifications of the lens, than the positioning data by modifying its number, size, and arrangement.

Figure 20:
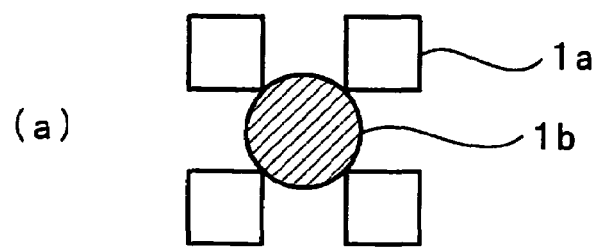
FIGS. 20A to 20D are plan views showing the effective size of the marker according to the present invention.
Figure 20:
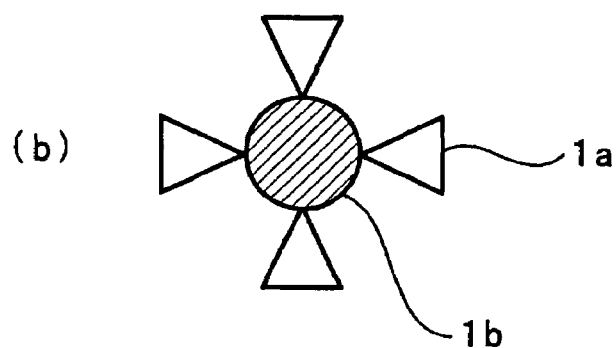
Figure 20:
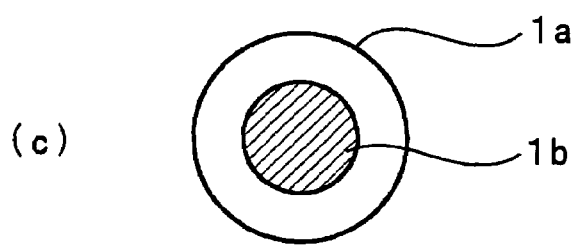
Figure 20:
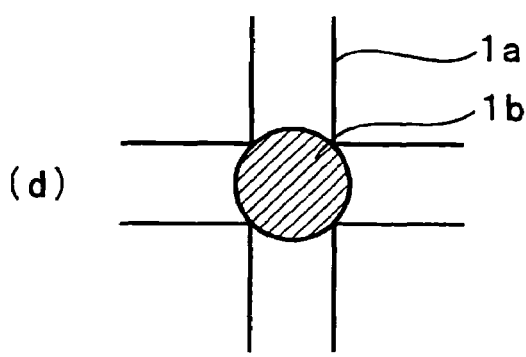

FIGS. 20A to 20D are plan views explaining an effective area for positioning with the marker according to the present invention. More specifically, FIG. 20A illustrates a group of the markers similar to those shown in FIG. 8B. As the center of the optical element denoted by the hatching in FIG. 20A is surrounded and defined by the markers, it can be the effect area 1b for positioning of the optical element. Accordingly, the maximum of the effective area 1b can determine the actual effectiveness of the markers according to the present invention.

FIG. 20B illustrates a set of the markers similar to those shown in FIG. 8C. This also allows the effective area 1b to be surrounded and defined by the triangle markers. The maximum of the effective area 1b can determine the effectiveness of the markers.

FIG. 20C illustrates a shape of the marker similar to that shown in FIG. 8E. This also allows the effective area 1b to be surrounded and defined by the annular marker 1a. The maximum or diameter of the effective area 1b can determine the effectiveness of the marker.

FIG. 20D illustrates two crossing lines of the marker at a right angle to each other. The effective area 1b is defined by the intersection between the two straight lines. The maximum or diameter of the effective area 1b can also determine the effectiveness of the marker.

The term "marker area" means the size of the marker.

Embodiment 5

Figure 9:
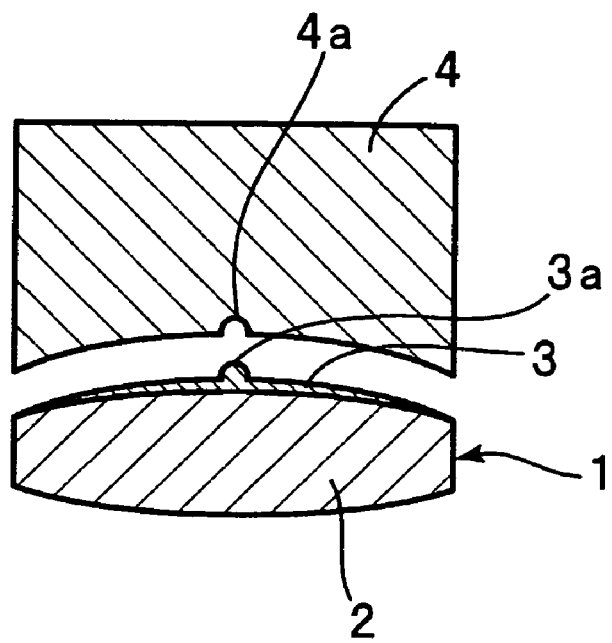
FIG. 9 is a cross sectional view of an optical element showing a further embodiment of the present invention.

FIG. 9 is a cross sectional view of a lens showing a further embodiment of the present invention. As shown in FIG. 9, the lens 1 as an optical element comprises an organic polymer layer 3 provided on a substrate 2. For example, the organic polymer layer 3 is provided on the substrate 2 made of a spherical surface glass lens, whereby the lens 1 is an aspherical composite lens.

The organic polymer layer 3 may be fabricated by shaping an organic polymer coated on the substrate 2 with a molding die 4 as shown in FIG. 9. With the molding die 4 having a recess 4a provided in the inner side at the center thereof, a marker 3a of a raised shape is shaped at the center of the organic polymer layer 3.

In this embodiment, the organic polymer layer 3 is made of a mixture of an organic metal polymer prepared by hydrolyzing and polymerizing metal alkoxide and an urethane acrylate resin. As the composite optical element or lens is made of such an organic/inorganic composite material, it can be improved in the thermal resistance and the dimensional stability.

Embodiment 6

FIGS. 10 to 14 illustrate step of conducting the forming of an organic polymer layer 3 on a substrate 2 with a molding die 4 similar to that of Embodiment 3 shown in FIG. 9.

This embodiment of the method resides in s a second aspect of the present invention, involving measuring the diameter of the substrate and the die, calculating a dislocation in the position between the substrate and the die from a difference between the two measurements of the diameter, moving either the substrate or the die by a distance equal to the dislocation, and molding the organic polymer layer with the die of which the position is aligned with the substrate across the horizontal.

Figure 10:
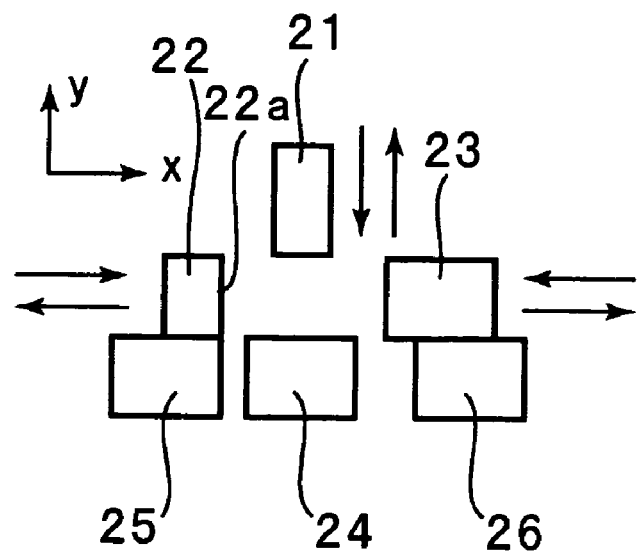
FIG. 10 is a side view of a manufacturing equipment where a method of manufacturing an optical element is conducted showing a second aspect of the present invention.
Figure 11:
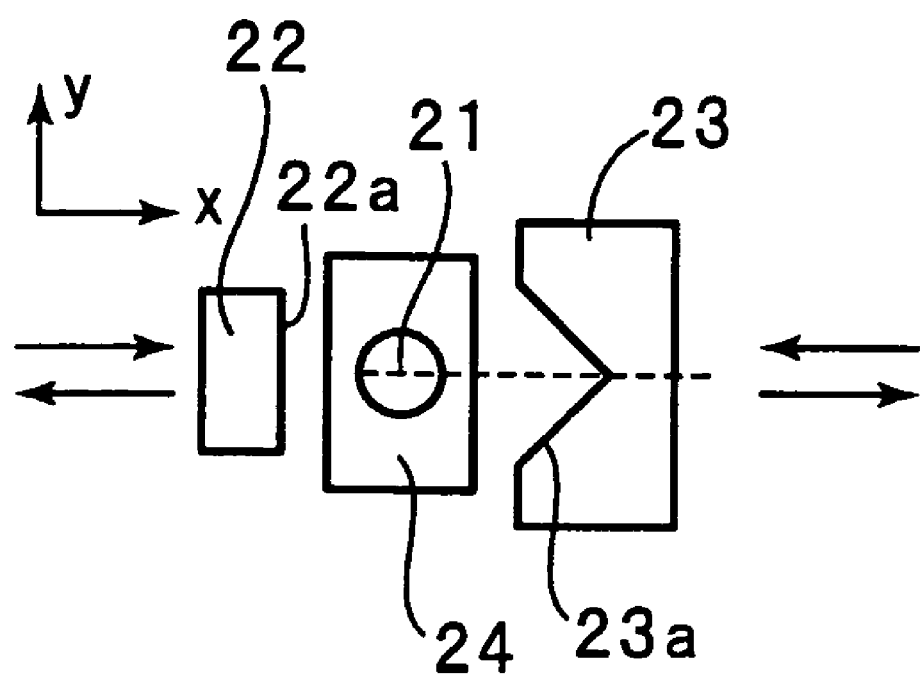
FIG. 11 is a plan view of the manufacturing equipment where the method of manufacturing an optical element is conducted according to the second aspect of the present invention.
Figure 12:
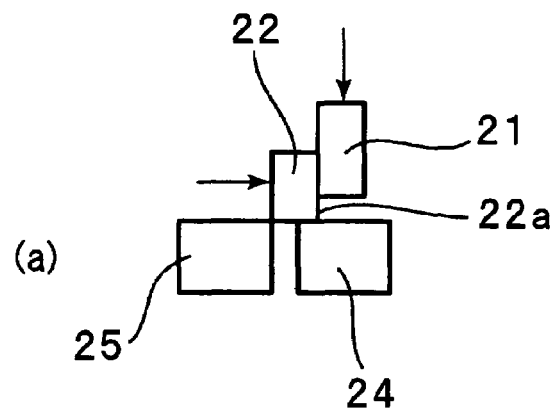
FIGS. 12A to 12C are side views of the manufacturing equipment where the method of manufacturing an optical element is conducted according to the second aspect of the present invention.
Figure 12:
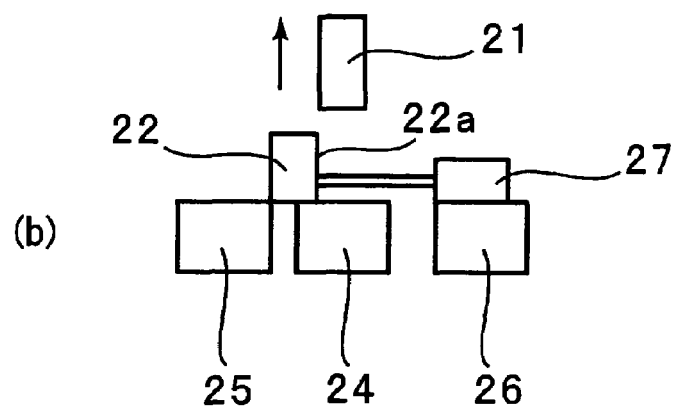
Figure 12:
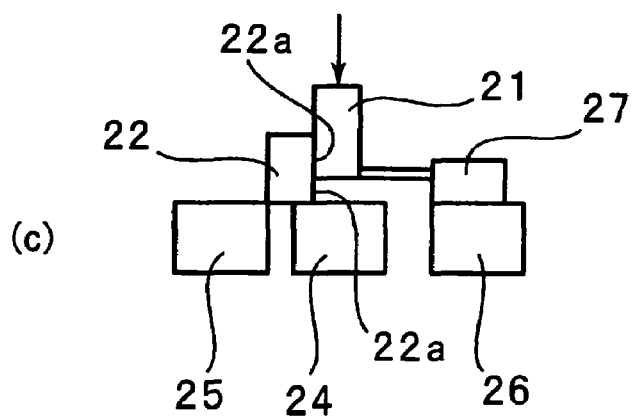
Figure 13:
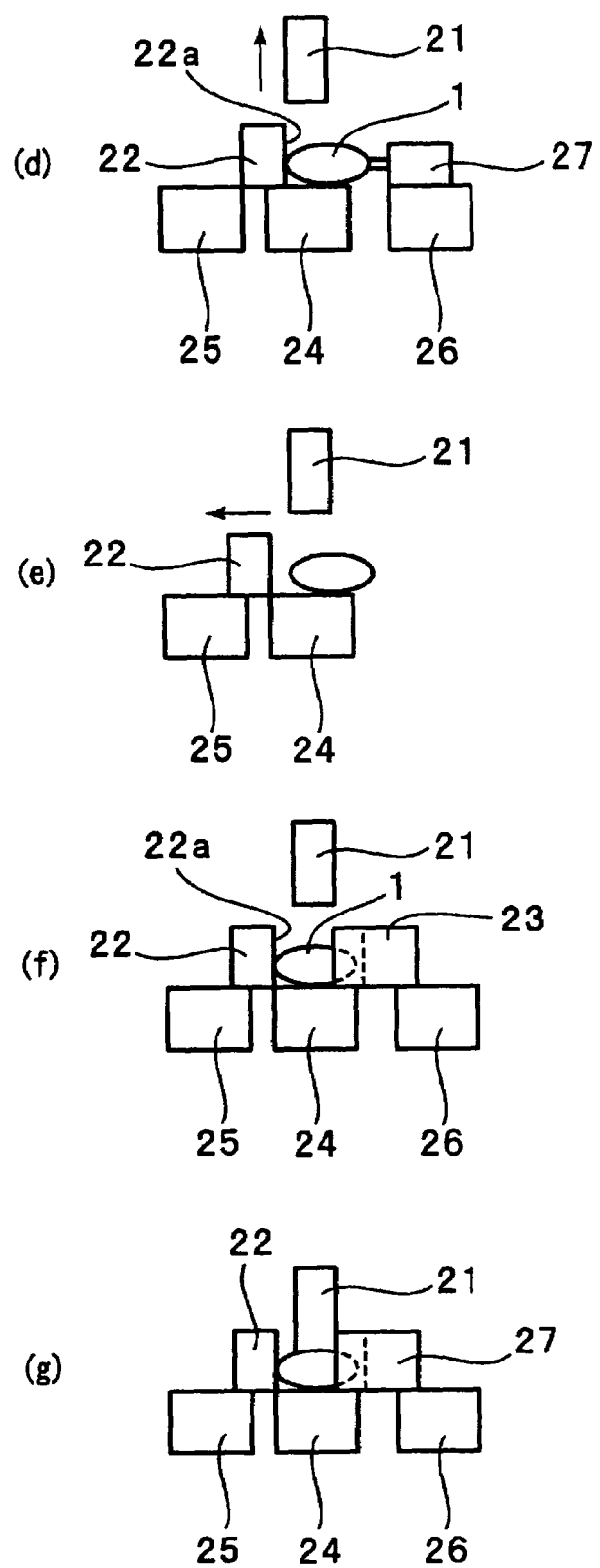
FIGS. 13D to 13G are side views of the manufacturing equipment where the method of manufacturing an optical element is conducted according to the second aspect of the present invention.

FIG. 10 is a side view of an equipment employing the method of this embodiment. FIG. 11 is a plan view of the same. As shown in FIG. 10, a planar block 22 having a reference surface 22a is placed on a stage 25 while a V block 23 is placed on another stage 26. The V block 23 may be replaced by a micrometer 27 as described later. A lens stage 24 is provided between the two stages 25 and 26. A die 21 is provided above the lens stage 24. The die 21 is arranged for movement along the z axis or the vertical direction.

Both the planar block 21 and the V block 23 are arranged for movement along the x axis respectively.

As shown in FIG. 11, the center of a V slot 23a in the V block 23 is aligned with the center of the die 21 along a straight line extending in parallel with the x axis.

The lens stage 24 is made of a glass material. An ultraviolet light source and a shutter for controlling the transmission of ultraviolet light, both not shown, are provided beneath the lens stage 24. The ultraviolet light source is provided for emitting an ultraviolet light to cure the organic polymer layer.

The method starts with, as shown in FIG. 12A, lifting down the die 21 and moving the planar block 22 to the right until its reference surface 22a comes into direct contact with the die 21.

This is followed by, as shown in FIG. 12B, lifting up the die 21 and placing a micrometer 27 on the stage 26. Then, the head of the micrometer 27 is advanced up to the reference surface 22a of the planar block 22 before the distance to the reference surface 22a is measured.

As shown in FIG. 12C. the die 21 is lifted down once again until its one side comes into direct contact with the reference surface 22a of the planar block 22. Then, the head of the micrometer 27 is moved to come into direct contact with the other side of the die 21 and the distance to the other end of the die 21 is measured. This allows the diameter of the die 21 to be calculated.

Then, the lens 1 is placed on the lens stage 24 so that its one side comes into direct contact with the reference surface 22a of the planar block 22 as shown in FIG. 13D. This is followed by advancing the head of the micrometer 27 up to the other side of the lens 1. This allows the diameter of the lens 1 to be calculated.

Then, the planar block 22 is moved to the left by a distance equal to a half the diameter of the lens or the die, as shown in FIG. 13E.

Figure 14:
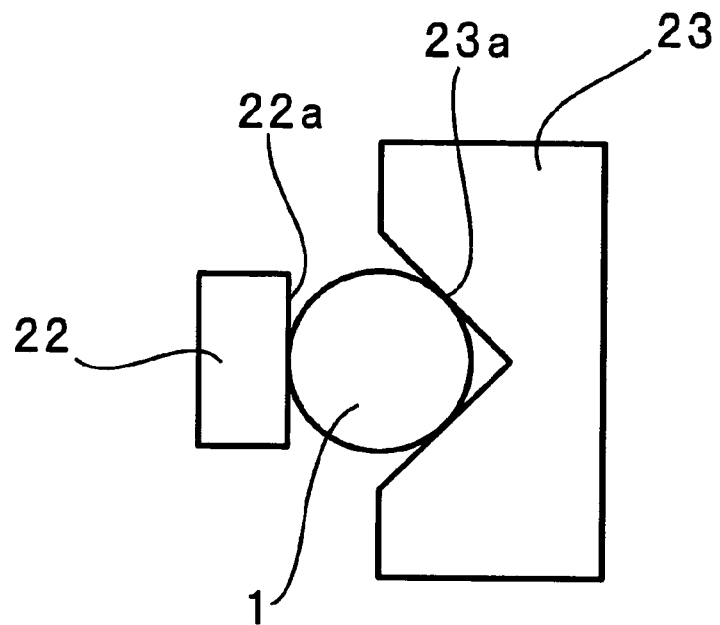
FIG. 14 is a plan view showing a lens positioned with the use of a V block.

Next, as shown in FIG. 13F, the V block 23 is placed on the stage 26 in place of the micrometer 27 and moved to the left for carrying the lens 1 leftwardly until the lens 1 comes at one end into direct contact with the reference surface 22a of the planar block 22 and its position is thus determined. More particularly, as shown in FIG. 14, the lens 1 remains in direct contact with the reference surface 22a of the planar block 22 and at its position while being supported by the V block 23. This is followed by introducing a predetermined amount of the organic polymer material of an uncured form onto the lens 1 and lifting down the die 21. As the result, the state is as shown in FIG. 13G.

As shown in FIG. 13G, with the lens 1 remaining pressed down by the die 21, the shutter beneath the lens stage 24 is released for exposure to ultraviolet light from the ultraviolet light source. The organic polymer layer developed between the lens 1 and the die 21 is then exposed to and cured by the ultraviolet light.

As described, the method according to the second aspect of the present invention allows the lens and the die to be aligned and positioned with ease and accuracy for favorably developing the organic polymer layer on the lens. Since the die is positioned at higher accuracy, it can shape the marker on the lens at higher precision.

Embodiment 7

Figure 15:
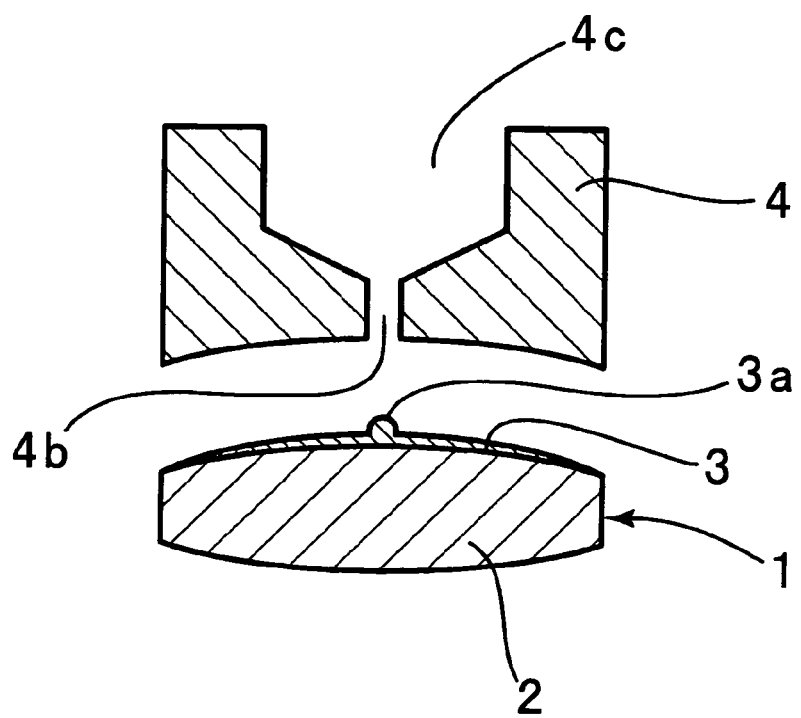
FIG. 15 is a cross sectional view of an optical element showing a still further embodiment of the present invention.

FIG. 15 is a cross sectional view showing a lens as an optical element according to a further embodiment of the present invention. As shown in FIG. 15, the lens 1 comprises an organic polymer layer 3 provided on a substrate 2 made of a glass material. The organic polymer layer 3 has a marker 3a provided therein as aligned with the center of the lens 1.

In this embodiment, the organic polymer layer 3 is shaped with the use of a die 4 which has a filling inlet 4b provided therein. For the purpose, with the die 4 seating over the substrate 2, an organic polymer material is fed into a reservoir 4c in the die 4 and injected through the filling inlet 4b from the reservoir 4c to develop the organic polymer layer 3 over the substrate 2. The organic polymer layer 3 in this embodiment may be equal to that of Embodiment 3. Accordingly, the layer 3 can be cured by ultraviolet light emitted from below.

The marker 3a in this embodiment is shaped as a burr in the filling inlet 4b of the die 4. For the purpose, the inner diameter of the filling inlet 4b may thus be arranged to range preferably from 50 μm to 200 μm. As the result, the marker 3a may be shaped within a range of the diameter from 50 μm to 200 μm.

Embodiment 8

Figure 16:
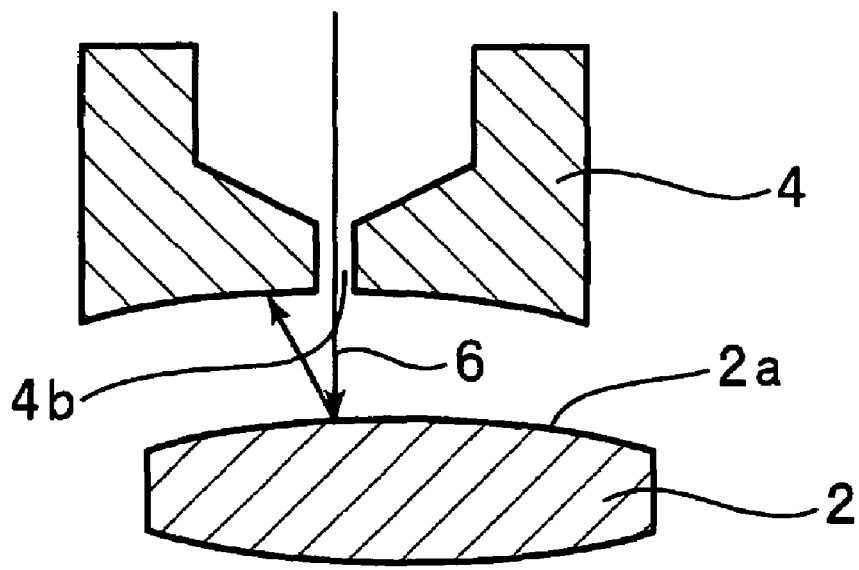
FIGS. 16A and 16B are cross sectional views showing a method of manufacturing an optical element according to a third aspect of the present invention.
Figure 16:
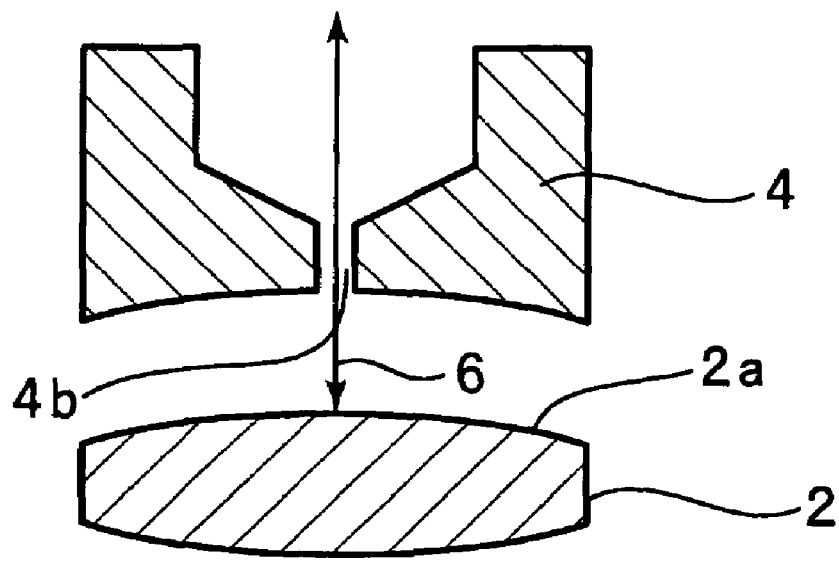

FIGS. 16A and 16B are cross sectional views showing steps of a method for positioning the die 4 shown in FIG. 15 over the substrate 2 according to a third aspect of the present invention, As shown in FIG. 16A, the method starts with locating the die 4 above the substrate 2 and projecting autocollimator light 6 across the filling inlet 4b of the die 4 onto a spherical surface 2a of the substrate 2 which is a spherical lens. If the filling inlet 4b is dislocated from the center of the spherical lens 2, it fails to correctly receive a reflection of the autocollimator light 6 from the spherical surface 2a to which the autocollimator light 6 has been projected. When the filling inlet 4b is correctly aligned with the center of the spherical lens 2, it can correctly receive a reflection of the autocollimator light 6 from the spherical surface 2a which extends along the horizontal as shown in FIG. 16B, and a detector detects the reflection.

It is hence judged from the reflection of the autocollimator light 6 whether or not the filling inlet 4b in the die 4 is correctly aligned with the center of the spherical lens 2. With its filling inlet 4b remaining positioned at the center of the spherical lens 2, the die 4 is lifted down to the spherical lens 2 for depositing the organic polymer layer 3 as shown in FIG. 15. As the result, the marker 3a can accurately be developed at the center of the spherical lens 2.

Embodiment 9

Figure 17:
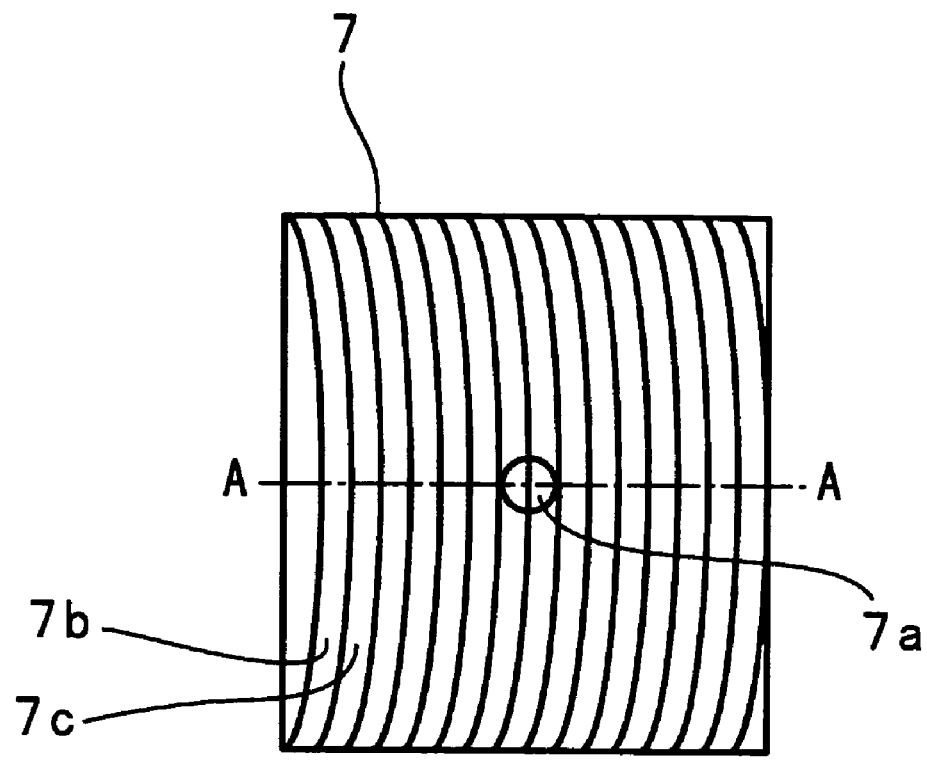
FIG. 17 is a plan view of an optical element showing a still further embodiment of the present invention.
Figure 18:
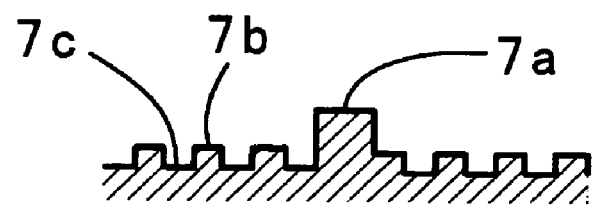
FIG. 18 is a cross sectional view taken along the line A-A of FIG. 17.

FIG. 17 is a plan view of a diffractive optical element as an optical element according to a further embodiment of the present invention. FIG. 18 is a cross sectional view taken along the line A-A of FIG. 17.

As shown in FIGS. 17 and 18, the diffractive optical element is arranged by repeating a projection 7b and a recess 7c. In this embodiment, a marker 7a of a projection form is provided at the center.

The diffractive optical element of this embodiment may be designed as a computer programmable hologram for use in an optical pickup, having three functions: splitting a beam into three components, acting as a beam splitter for separating and directing a return of light from an optical disk towards a photo IC, and providing an astigmatic difference for detection of focusing error. For example, the diffractive optical element may be made of an ARTON resin commercially available from JSR as described with Embodiment 2.

Figure 19:
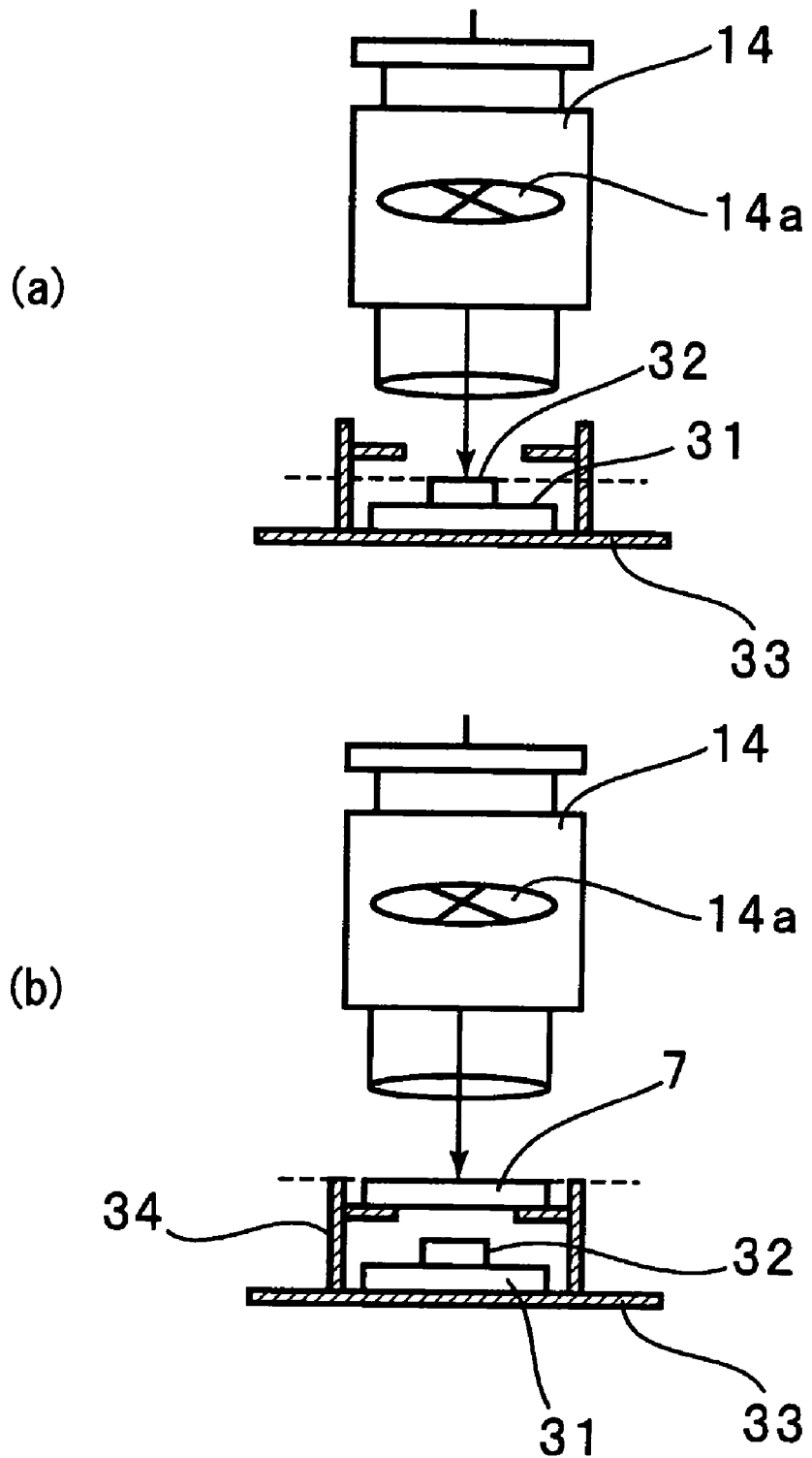
FIGS. 19A and 19B are cross sectional views showing steps of assembling a hologram unit including the optical diffractive optical element shown in FIG. 17.

FIGS. 19A and 19B are cross sectional views illustrating steps of fabricating a hologram unit with the diffractive optical element shown in FIGS. 17 and 18.

As shown in FIG. 19A, the process starts with mounting a semiconductor laser 32 at a specific position on a photo IC 31. This step for accurate positioning may be conducted by a common die bonding technique. The photo IC on which the semiconductor laser is mounted is then bonded by a silver paste to a lead frame 33. The positioning at this step may be assisted by a marker provided as the reference on the lead frame 33.

The resultant lead frame 33 is then placed on the stage of a microscope 14 as shown in FIG. 19A. At the time, the emitting point of the semiconductor laser 32 is used as a marker for aligning with the center in a scale 14a of the microscope 14.

This is followed by placing the diffractive optical element 7 on the lead frame 33 using a vacuum collet holding its sides and adjusting the height of the stage of the microscope 14 so that the marker 7a of the diffractive optical element 7 is clearly viewed. Then, while the lead frame 33 and the microscope 14 remain held at the position, the diffractive optical element 7 is adjusted with its horizontal position. More particularly, using the scale 14a in the microscope 14, the marker 7a of the diffractive optical element 7 is accurately positioned to the center. Then, the diffractive optical element 7 at the position is joined by adhesive to the lead frame 33.

By the foregoing steps, the diffractive optical element of this embodiment can be assembled together with the semiconductor laser and the photo IC to construct the hologram unit.

Embodiment 10

Figure 21:
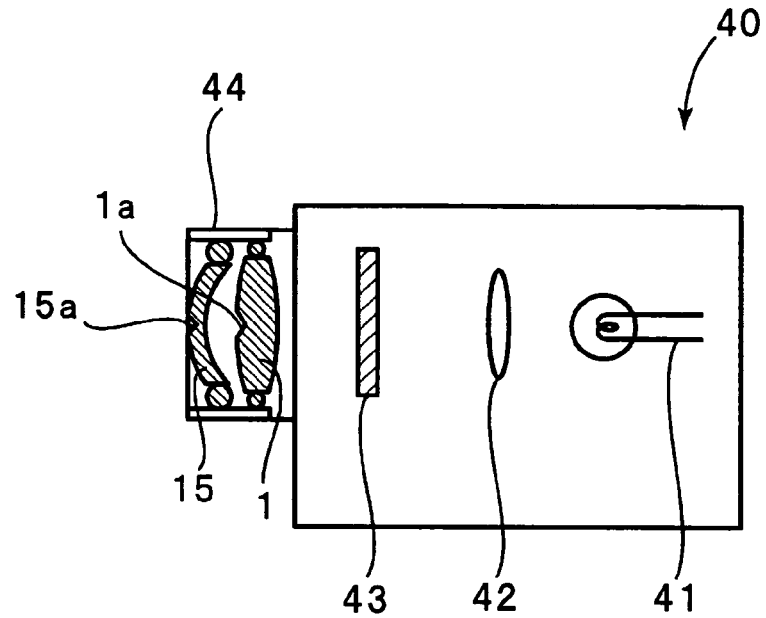
FIG. 21 is a schematic cross sectional view of a projector showing a still further embodiment of the present invention.

FIG. 21 is a schematic cross sectional view showing a projector as an optical equipment according to a further embodiment of the present invention. The projector 40 shown in FIG. 21 employs an achromatic system 44 similar to that of Embodiment 2 of which the manufacturing steps are shown in FIGS. 4A to 4D. In the projector 40 of this embodiment, light emitted from an illuminating lamp 41 is passed through an illumination lens 42, modified by a liquid crystal display (LCD) 43 which produces an optical image, and projected by the optical system 44 on a screen.

The lens diameter of the optical system 44 in this embodiment is 50 mm. The marker 1a of the lens 1 and the marker 15a of another lens 15 in the optical system 44 both are 200 μm in the effective size. Assuming that the projector of this embodiment produces an image of the S/VHS video format at substantially 46 dB of S/N ratio (at 200× enlargement), the diameter of each marker may be 1/D, namely 3.6 mm, or smaller where D is the dynamic range of the video signal. However, the effective size in this embodiment is set to 200 μm because it is visible through an optical microscope.

Embodiment 11

Figure 22:
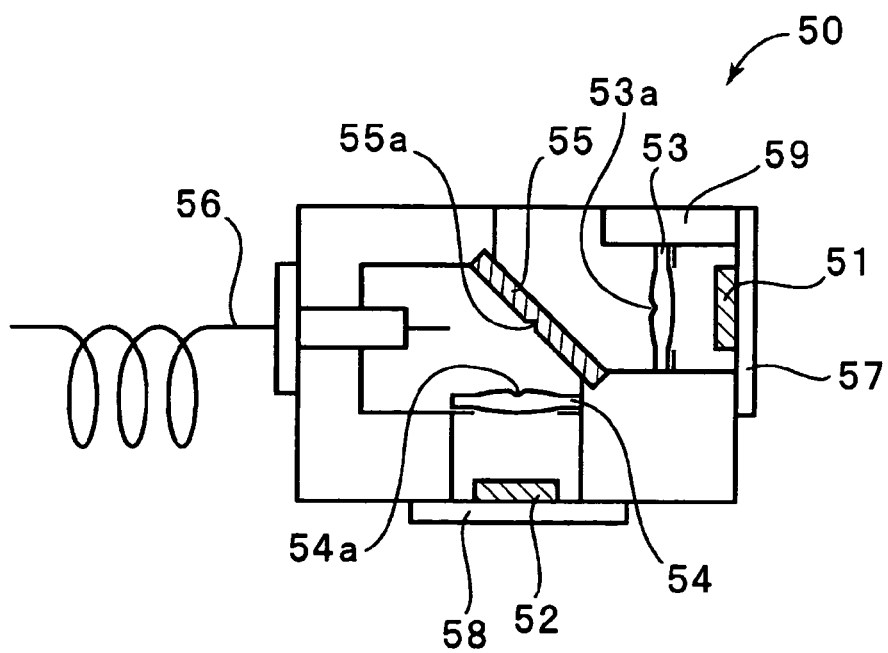
FIG. 22 is a schematic cross sectional view of an optical transceiver module for fiber optic communications showing a still further embodiment of the present invention.

FIG. 22 is a schematic cross sectional view showing an optical transceiver module for optical fiber communications as an optical equipment according to the present invention. The optical transceiver module 50 for optical fiber communications of this embodiment comprises a light-emitting device 51, a photodetector 52, and a wavelength selector filter 55 assembled in a housing 59. A lens 53 is provided between the wavelength selector filter 55 and the light-emitting device 51 while another lens 54 is provided between the wavelength selector filter 55 and the photodetector 52. The housing 59 is connected with one end of a fiber optic 56. The light-emitting device 51 and the lens 53 are mounted on a frame 57 which is anchored to the inner side of the housing 59. Similarly, the photodetector 52 and the lens 54 are mounted on another frame 58 which is anchored to the inner side of the housing 59.

The lens 53 has a marker 53a provided on the center of an effective optical surface thereof. The lens 54 has a marker 54a provided on the center of an effective optical surface thereof. The wavelength selector filter 55 has a marker 55a provided on the center of an effective optical surface thereof.

In action, light emitted from the light-emitting device 51 is passed through the lens 53 and received by the wavelength selector filter 55 where its wavelength is allowed to advance to the one end of the fiber optic 56. This allows the light emitted from the light-emitting device 51 to be passed to the one end of the fiber optic 56 for transmission of its signal further over the fiber optic 56.

Light received at the one end of the fiber optic 56 in the optical transceiver module 50 is directed to the wavelength selector filter 55 where its wavelength is not transmitted straight but reflected. A reflection of the wavelength from the wavelength selector filter 55 is then passed through the lens 54 and received by the photodetector 52. This allows the light from the one end of the fiber optic 56 to be received by the photodetector 52 where its signal is demodulated.

Both the lenses 53 and 54 in the optical transceiver module 50 of this embodiment is 1 mm in the diameter. The markers 53a and the 54a of the two lenses 53 and 54 are 200 μm in the effective size. Also, the effective size of the marker 55a provided on the wavelength selector filter 55 is 200 μm. The optical transceiver module 50 of this embodiment can hence conduct the action of transmitting and receiving optical signals over the fiber optic 56 without being interrupted by the markers 53a, 54a, and 55a.

FIGS. 23A to 23E are schematic cross sectional views showing steps of manufacturing the optical transceiver module 50 of the embodiment shown in FIG. 22.

Figure 23:
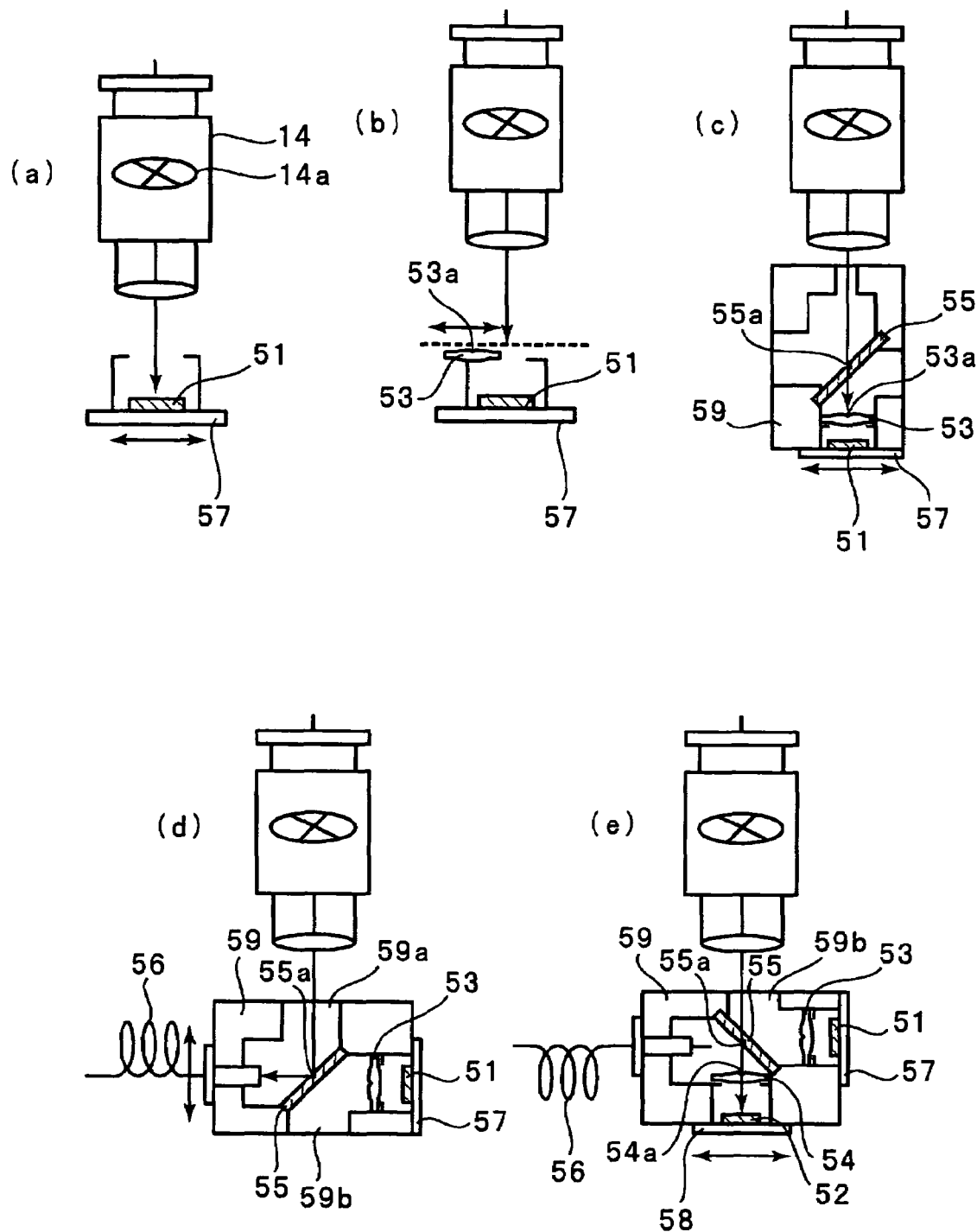
FIGS. 23A to 23E are schematic cross sectional views showing steps of manufacturing the optical transceiver module shown in FIG. 22.

As shown in FIG. 23A, the action starts with positioning the light-emitting device 51 to a predetermined location on the frame 57 with the use of an optical microscope 14. The positioning is made by adjusting a pattern of electrode provided on the light-emitting device 51 to the scale 14a in the viewing field of the optical microscope 14.

This is followed by mounting the lens 53 above the frame 57 as shown in FIG. 23B. The mounting is made by adjusting the marker 53a of the lens 53 to the light-emitting device 51 for correct positioning. More particularly, the light-emitting device 51 is aligned with the lens 53 so that its electrode pattern is used as a marker.

Then, the frame 57 carrying the lens 53 and the light-emitting device 51 is installed at a predetermined position in the housing 59, as shown in FIG. 23C. The wavelength selector filter 55 (bandpass filter) is mounted at an angle of 45 degrees in the housing 59. More specifically, for positioning and joining the frame 57 to the housing 59, the marker 55a of the wavelength selector filter 55, and the marker 53a of the lens 53, and the electrode pattern of the light-emitting device 51 are aligned straight along one line before bonding the frame 57 to the inner side of the housing 59. The bonding may be implemented with not only an adhesive but also any applicable technique such as laser spot welding.

This is followed by orientating the housing 59 so that the wavelength selector filter 55 is viewed through an opening 59a provided in the housing 59, positioning the fiber optic 56 so that its distal end is viewed through reflection over the wavelength selector filter 55, and joining the distal end of the optic fiber 56 to the housing 59 by an adhesive or any applicable means, as shown in FIG. 23D. More particularly, light is conveyed over the fiber optic 56, reflected by the wavelength selector filter 55, and aligned with the marker 55a of the wavelength selector filter 55 while being monitored with the optical microscope 14 for correctly positioning the fiber optic 56 in relation to the housing 59.

Then, as shown in FIG. 23E, the photodetector 52 and the lens 54 are mounted to the housing 59. More particularly, like the light-emitting device 51 and the lens 53 mounted by the manner shown in FIGS. 23A and 23B, the photodetector 52 and the lens 54 are positioned and mounted to the frame 58 which is in turn fitted into the opening 59a provided in the housing 59. For positioning and joining the frame 58 to the housing 59, the light marker 55a of the wavelength selector filter 55, the maker 54a of the lens 54, and the electrode pattern as a marker of the photodetector 52 are aligned straight along one line. Then, the frame 58 is secured to the housing 59 by an adhesive or any applicable means.

As set forth above, the light-emitting device 51, the photodetector 52, the lens 53, the another lens 54, the wavelength selector filter 55, and the one end of the fiber optic 56 are correctly positioned and assembled to the optical transceiver module 50.

What is claimed is:

1. An optical element comprising:
   a substrate; and
   an organic polymer layer having an effective optical area and being provided on said substrate;
   wherein said organic polymer layer has a marker for positioning of the effective optical area of said optical element in an optical system, wherein the optical element is a lens.

2. The optical element according to claim 1, wherein said marker is in the form of an optical fault.

3. The optical element according to claim 2, wherein said organic polymer layer has an optical fault in said effective optical area.

4. The optical element according to claim 3, wherein said optical fault has an effective size that can be monitored within a viewing field of an optical microscope.

5. The optical element according to claim 1, wherein said marker is a projection, a recess, a tinted portion, a different refraction portion, an air bubble, or a particle provided in said organic polymer layer.

6. The optical element according to claim 1, wherein said marker is provided at the center or around the center of the optical element.

7. The optical element according to claim 1, wherein said marker has an effective size that can be monitored within a viewing field of an optical microscope.

8. The optical element according to claim 1, wherein said marker has an effective size of not greater than 200 μm.

9. The optical element according to claim 1, wherein said substrate is made of a glass material.

10. The optical element according to claim 1, wherein said substrate is made of an optical resin.

11. An optical system comprising:
at least one optical element defined in claim 1.

12. Optical equipment comprising:
the optical system defined in claim 11 acting as an image focusing optical system.

13. The optical equipment according to claim 12, wherein the dynamic range of an image signal to be processed is D, and the area of the marker is arranged to be not greater than 1/D times the effective optical area.

14. A method of manufacturing optical equipment from the optical element defined in claim 1, and a component provided for carrying a marker or a pattern used as the marker, comprising the steps of:
placing any of the optical element and the component so that the marker or the pattern is aligned with a specific location in a viewing field of a microscope; and
while the microscope remains fixed at its position along the horizontal, placing the other, the component or the optical element, so that the marker or the pattern is aligned with a specific location in the viewing field of a microscope thus to correctly position the optical element and the component along a horizontal direction.

15. A method of manufacturing an optical element comprising:
preparing a substrate; and
providing on said substrate an organic polymer layer having a marker for positioning of an effective optical area thereof in an optical system, wherein said organic polymer layer is shaped with at least one die which has a marker forming region, and said marker is shaped by said marker forming region.

16. The method of manufacturing an optical element according to claim 15, wherein the die has a filling inlet provided therein for introducing the organic polymer material or its pre-cured, liquid form into the die, and is arranged so that when the organic polymer material or its pre-cured, liquid form is introduced into the die, a burr can be produced at the location of the filling inlet, which burr is used in formation of said marker, thus allowing the filling inlet to serve as a marker forming region of the die.

17. The method of manufacturing an optical element according to claim 16, wherein said substrate is a spherical lens,
the method further comprising:
placing the die provided with the filling inlet on the spherical lens, which remains seated along a horizontal direction with its spherical side facing upwardly, so that the filling inlet faces downwardly to extend along a vertical direction;
illuminating the spherical lens with an autocollimator light across the filling inlet of the die and correctly positioning the spherical lens and the die along said horizontal when the autocollimator light is reflected by the spherical side and passed through the filling inlet; and
while the spherical lens and the die remain correctly positioned along the horizontal, moving the substrate or the die along the vertical direction to press the die against the substrate for shaping the organic polymer material.

18. The method of manufacturing an optical element according to claim 15, wherein the method further comprises:
measuring the diameter of both the substrate and the die;
calculating from a difference in the measurement of said diameters, when each of the substrate and the die has been pressed against a reference surface, a dislocation along a horizontal direction from the reference surface, and moving the substrate or the die away from the reference surface by a distance equal to the dislocation to thus position the substrate and the die correctly along the horizontal direction; and
while the substrate and the die remain correctly positioned along the horizontal, moving the substrate or the die in a vertical direction until the substrate and the die come into direct contact with each other and shaping the organic polymer material with the die.

19. Optical equipment comprising an optical element, said optical element comprising:
a substrate; and
an organic polymer layer having an effective optical area and being provided on said substrate;
wherein said organic polymer layer has a marker for positioning of said effective optical area within said optical equipment, wherein the optical element is a lens.

20. The optical equipment according to claim 19, further comprising a component on which the optical element is positioned and secured, said component having a marker or a pattern used for correctly positioning said optical element in relation to said component.

* * * * *